United States Patent
Kaplan et al.

[11] Patent Number: 6,145,318
[45] Date of Patent: Nov. 14, 2000

[54] DUAL ORIFICE BYPASS SYSTEM FOR DUAL-FUEL GAS TURBINE

[75] Inventors: Howard Jay Kaplan, Clifton Park; Joel Thomas Stimpson, Saratoga Springs, both of N.Y.

[73] Assignee: General Electric Co., Schenectady, N.Y.

[21] Appl. No.: 09/177,224

[22] Filed: Oct. 22, 1998

[51] Int. Cl.[7] ........................................... F02C 1/00
[52] U.S. Cl. .................... 60/728; 60/39.02; 60/742; 60/39.094
[58] Field of Search .................. 60/742, 39.07, 60/39.094, 728, 726, 39.02

[56] References Cited

U.S. PATENT DOCUMENTS

| | | | |
|---|---|---|---|
| 3,826,080 | 7/1974 | Corso et al. | 60/39.55 |
| 4,387,559 | 6/1983 | Leto | 60/39.32 |
| 4,711,085 | 12/1987 | Lyons | 60/39.141 |
| 4,753,068 | 6/1988 | El-Masri | 60/39.511 |
| 5,129,222 | 7/1992 | Lampe et al. | 60/39.27 |
| 5,329,760 | 7/1994 | Bradley et al. | 60/39.06 |
| 5,720,164 | 2/1998 | Corbett et al. | 60/39.53 |
| 5,799,872 | 9/1998 | Nesbitt et al. | 239/8 |

Primary Examiner—Charles G. Freay
Assistant Examiner—Robert Z. Evora
Attorney, Agent, or Firm—Nixon & Vanderhye

[57] ABSTRACT

Compressor discharge air flows through a heat exchanger in heat exchange relation with cooling water and is supplied at reduced temperature in atomizing air and purge modes to combustors in a dual-fuel gas turbine. The heat exchanger has a pair of bypass passages in parallel with a temperature regulating valve controlling flow of water through the heat exchanger in response to the temperature of the compressor discharge air exiting the heat exchanger. Should the flow control valve close in response to low temperature of the compressor discharge air, in the air atomizing mode, the bypass passages with orifices therein provide a minimum protective flow of cooling water to the heat exchanger. In the purge mode where only half the air flow and heat rejection is required in the heat exchanger and the flow control valve closes, a bypass valve in one of the bypass passages closes to enable reduced flow of cooling water through the heat exchanger.

12 Claims, 4 Drawing Sheets

DUAL ORIFICE BYPASS SYSTEM FOR DUAL-FUEL GAS TURBINE

TECHNICAL FIELD

The present invention relates to a system for controlling the temperature of compressor discharge air in a dual-fuel gas turbine and particularly relates to a staged dual bypass system for controlling the temperature of the compressor discharge air for both liquid fuel and gas fuel operations, requiring two distinct heat rejection modes while using a single heat exchanger.

BACKGROUND OF THE INVENTION

In dual-fuel gas turbines, the turbine operates by burning either a gaseous fuel or a liquid fuel, the latter fuel being typically distillate oil. Whenever burning one fuel, the nozzles for the other fuel must be continuously purged. For example, when gaseous fuel is burned in the turbine combustors, the liquid fuel, atomizing air and water injection nozzles of the combustors are purged using cooled compressor discharge air. When burning liquid fuel, atomizing air is supplied to the combustor for atomizing the liquid fuel, while the gas fuel nozzles are purged using compressor discharge air directly from the casing. In an air atomizing mode during liquid fuel operations, compressor discharge air at a reduced temperature, for example, of 225° F., is supplied to atomize the liquid fuel flowing through the liquid fuel nozzle, while during a purge mode, the compressor discharge air at reduced temperature and pressure is supplied as purge air to the liquid fuel, atomizing air and water injection nozzles. It will be appreciated that during the atomizing air mode for liquid fuel operations, the pressure ratio is higher, i.e., a higher pressure ratio is needed to atomize the fuel oil than simply to keep the nozzle passages clear. Thus, in the purge mode during gas fuel operations, the flow of compressor discharge purge air is reduced, for example, to about half the flow than would be the case in the air atomizing mode but at the same temperature.

As well known, a gas turbine compressor discharges air at a substantially constant temperature, for example, on the order of 800° F. In the atomizing air mode, 100% of the system air is used in the combustors to atomize the liquid fuel, while in the purge mode, approximately only 50% of the system air is used for purging. In both the atomizing and purge air modes, the compressor discharge air is reduced in temperature, i.e., cooled in a heat exchanger, to approximately 225° F. A cooling medium, typically, and hereafter referred to as water, is placed in heat exchange relation with the compressor discharge air to reduce the air temperature to the desired temperature. This reduced air temperature is obtained by controlling the flow of the water through the heat exchanger. The cooling water inlet temperature to the heat exchanger varies considerably based on seasonal ambient conditions. The system must also be sized for worst-case conditions, i.e., the atomizing air condition since in the purge mode, the heat rejection to the cooling water in the heat exchanger is approximately half that of the heat rejection in the atomizing air mode.

In a conventional system for controlling the temperature of the compressor discharge air, the flow of cooling medium through the heat exchanger is controlled by a temperature regulating valve responsive to the temperature of the compressor discharge air exiting the heat exchanger. Should the ambient temperature of the cooling water, however, be low, for example, when using cooling water supplied during winter conditions, the reduction in water flow can cause the water to boil in the heat exchanger. This, in turn, can result in damage to the heat exchanger and cause a shutdown of the turbine. Recognizing that problem, an orifice bypass around the water flow control valve has been previously provided. This ensures a protective minimum flow of water through the heat exchanger when the magnitude of the heat rejected to the cooling water in the heat exchanger is such that the temperature of the air exiting the heat exchanger is lowered to a temperature causing the temperature control valve to close. Over-cooling the discharge air disadvantageously produces increased condensation which must be eliminated and otherwise compromises the system.

The problem of not being able to reduce the water flow sufficiently at lower ambient water inlet temperatures to the heat exchanger is exacerbated when the system is operated in the purge mode rather than in the atomizing air mode. In the purge mode, the heat rejected to the cooling water in the heat exchanger is greatly reduced, e.g., on the order of one-half, relative to the heat rejection in the atomizing air mode, and the required cooling water flow is thus reduced. Because the heat exchanger is sized for the maximum heat rejection at maximum cooling water temperature, the desired compressor discharge air temperature of 225° F. becomes impossible to maintain at minimum heat rejection and low ambient cooling water inlet temperature conditions, resulting in over-cooling of the compressor discharge air.

BRIEF SUMMARY OF THE INVENTION

In accordance with the present invention, there is provided a staged dual bypass system in conjunction with a temperature responsive flow control valve which satisfies the requirements of both atomizing air and purge modes of operation, while employing a single heat exchanger. To accomplish this, the flow of cooling medium, e.g., water, is controlled as in the previously disclosed conventional system by a temperature regulating valve responsive to the temperature of the compressor discharge air exiting the heat exchanger. In contrast, however, a pair of passages bypassing the temperature regulating valve are provided, each passage having an orifice. The orifice restriction in a first bypass passage is sized to enable flow of the cooling water through the heat exchanger during operation in a purge mode when the temperature regulating valve is closed. This affords a reduced flow of cooling medium through the heat exchanger for cooling the compressor discharge air to approximately 225° F. and, consequently, prevents overcooling. That is, this first bypass passage with the orifice restriction is sized for purge mode operation and, consequently, the reduced flow of cooling water through the heat exchanger is able to maintain the temperature of the compressor discharge air exiting the heat exchanger at approximately 225° F. In the atomizing air mode, a bypass isolation valve in the second bypass passage is opened. Should the temperature regulating valve close in response to low ambient inlet cooling water temperature and hence decreased air temperature exiting the heat exchanger, the two bypass passages in the atomizing air mode afford a minimum protective cooling water flow through the heat exchanger to prevent heat build-up in the cooling water in the heat exchanger which could damage the heat exchanger and require shutdown of the turbine. The orifices in the two bypass passages are thus sized for the worst-case scenario in the atomizing air mode. Consequently, the staged dual bypass system hereof satisfies the performance requirements of two distinct system operating mode heat rejections while using a single heat exchanger.

In a preferred embodiment according to the present invention, there is provided apparatus for controlling the temperature of compressor discharge air supplied in a purge mode during gas fuel operation and in an atomizing air mode during liquid fuel operation in a dual-fuel gas turbine, comprising a heat exchanger for placing the compressor discharge air in heat exchange relation with a cooling medium at an inlet temperature to the heat exchanger lower than a temperature of the compressor discharge air for extracting heat from the compressor discharge air, a valve for controlling the flow of the cooling medium through the heat exchanger, first and second bypass flow passages connected in parallel on opposite sides of the flow control valve, each bypass flow passage having an orifice enabling a predetermined flow therethrough, a bypass valve in the second flow passage, the bypass valve being open in the atomizing air mode, enabling flow of the cooling medium through the first and second bypass flow passages and orifices and being closed in the purge mode, preventing flow through the second bypass passage.

In a further preferred embodiment according to the present invention, there is provided a method of controlling the temperature of compressor discharge air in a dual-fuel gas turbine having gas and liquid fuel operating modes, comprising the steps of passing the compressor discharge air in heat exchange relation with a cooling medium having an inlet temperature to the heat exchanger lower than the temperature of the compressor discharge air, controlling the flow of the cooling medium through the heat exchanger to regulate the temperature of the compressor discharge air exiting the heat exchanger, maintaining a minimum flow of cooling medium through the heat exchanger when operating the gas turbine in the liquid fuel mode and reducing the flow of cooling medium through the heat exchanger to a flow below the minimum flow when operating the gas turbine in the gas fuel mode.

Accordingly, it is a primary object of the present invention to provide a compressor discharge air temperature regulating system for a dual-fuel gas turbine that will operate in either an atomizing air mode or purge air mode to maintain the compressor discharge air exiting a heat exchanger at a predetermined temperature, e.g., approximately 225° F., while accommodating wide variations in inlet temperature of the cooling medium supplied the heat exchanger.

DETAILED DESCRIPTION OF THE INVENTION

Figure 1:
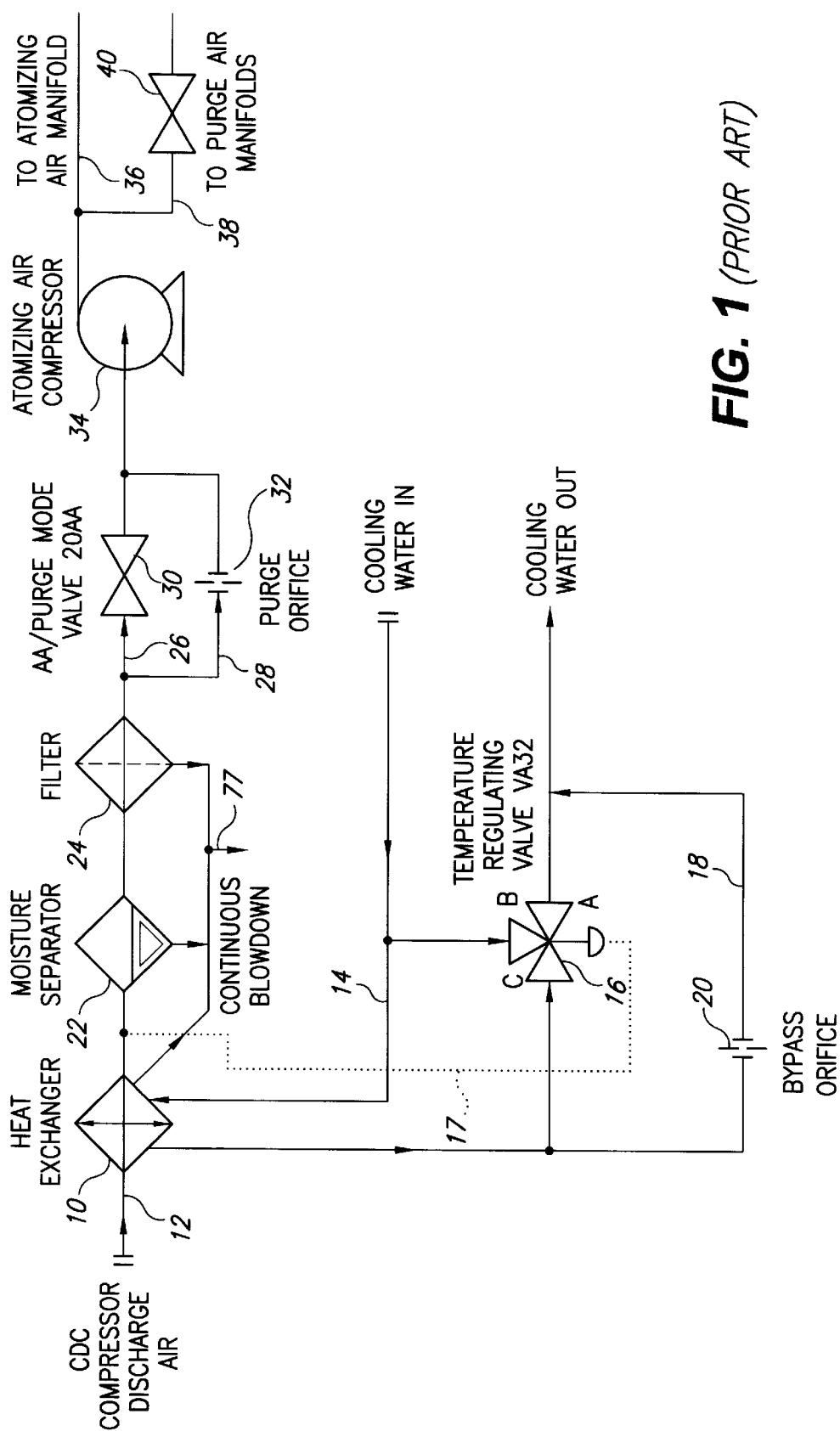
FIG. 1 is a schematic illustration of a compressor discharge air temperature control system of the prior art.

Referring to the prior art system of FIG. 1, there is schematically illustrated a heat exchanger 10 having compressor discharge air and cooling medium, e.g., water, inlets 12 and 14, respectively, for heat exchange between the two mediums whereby the compressor discharge air temperature can be reduced from approximately 800° F. to about 225° F. To accomplish this, the flow of the cooling medium through the heat exchanger is controlled by a temperature regulating valve 16 responsive to the temperature of the compressor discharge air exiting the heat exchanger 10, as indicated by the dotted line 17 in FIG. 1. That is, as the temperature of the air exiting heat exchanger 10 rises above or falls below the desired temperature, the flow of cooling medium is increased or reduced, respectively. Heat exchanger 10 may be a parallel flow or counterflow heat exchanger. In either case, the temperature of the compressor discharge air is maintained at a predetermined temperature at the exit of the heat exchanger 10 by controlling cooling medium, e.g., water, flow through heat exchanger 10.

In this prior art system, a bypass passage 18 having a bypass orifice 20 in the passage 18 lies in parallel with the valve 16. If the cooling medium inlet temperature is lower than normal, for example, under winter conditions where ambient temperature water is employed as the cooling medium, it will be appreciated that the flow of water through the heat exchanger must be reduced to maintain the desired air temperature exiting the heat exchanger thereby avoiding over-cooling. However, if the water flow is reduced too much, the water can boil in heat exchanger 10, which can result in damage to the heat exchanger and shutdown of the turbine. Consequently, the bypass passage 18 and orifice 20 are provided around the control valve 16 to ensure a protective minimum flow when the temperature of the compressor discharge air exiting heat exchanger 10 becomes too low and closes valve 16.

In the prior art system of FIG. 1, the exiting air flows through a moisture separator 22 and a filter 24 and splits into two passages 26 and 28. Passage 26 contains an atomizing air/purge mode valve 30, while passage 28 has a purge orifice 32. Passages 26 and 28 combine on the downstream sides of the valve 30 and orifice 32. The discharge air then flows to an atomizing air compressor 34, the outlet of which splits into passages 36 and 38. In a purge mode operation, the atomizing air/purge mode valve 30 is closed and reduced air flow, by approximately one-half, flows through the passage 28 and purge orifice 32. At the outlet of the compressor 34, the air is split to flow to the atomizing air nozzles of the combustors, not shown, via passage 36 and a purge air manifold valve 40 supplies purge air to purge air manifolds, not shown, for flowing purge air to the liquid fuel and water injection nozzles of the combustors during gas fuel operation. Conversely, during atomizing air mode operation, the atomizing air/purge mode valve 30 is open and the purge air manifold valve 40 is closed.

It will be appreciated that the minimum acceptable water flow through the heat exchanger 10 at low cooling water inlet temperatures may cause excessive over-cooling of the compressor discharge air exiting the heat exchanger when operating in the purge mode. This is a result of the reduced air flow through the heat exchanger during purge mode operation wherein the heat rejected to the cooling medium is substantially less, e.g., about half of the heat rejection than that in the atomizing air mode.

Figure 2:
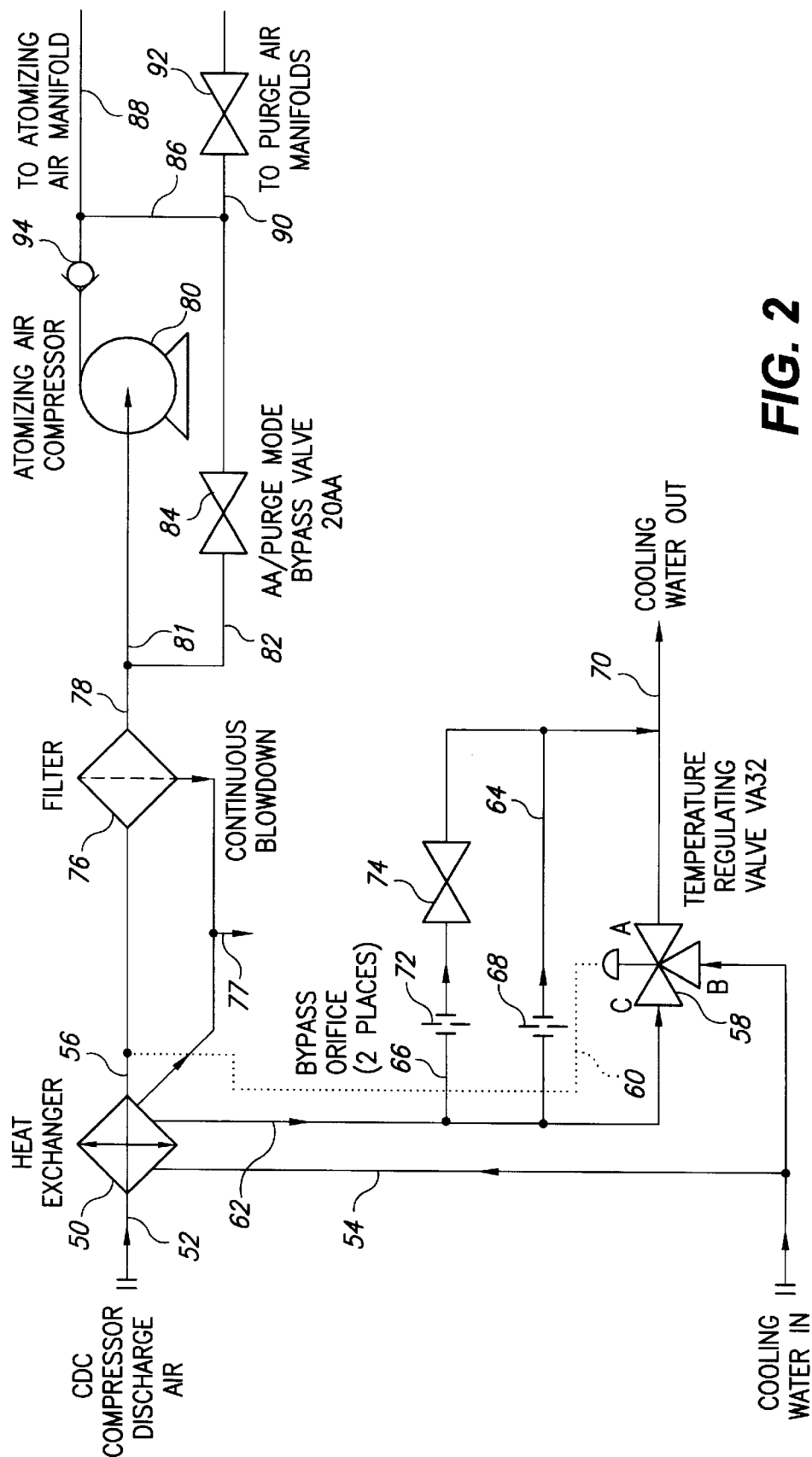
FIG. 2 is a schematic illustration of a compressor discharge air temperature control system according to the present invention employing a parallel flow heat exchanger and a non-boosted purge.

Referring to FIG. 2, there is illustrated a temperature control system for controlling the temperature of the compressor discharge air exiting the heat exchanger, employing staged dual bypass passages which satisfy the performance requirements of both the atomizing air and purge mode operating conditions while using a single heat exchanger. Referring to FIG. 2, there is provided a heat exchanger 50 having a compressor discharge air inlet 52, a cooling medium, e.g., water, inlet 54 and a compressor discharge air outlet 56 from heat exchanger 50. The flow of the cooling medium, e.g., water, through the heat exchanger 50 is controlled by a temperature regulating valve 58 responsive to the temperature of the compressor discharge air exiting the heat exchanger 50 as indicated by the dotted line 60. In the system illustrated in FIG. 2, a parallel flow heat exchanger is provided with the temperature regulating valve 58 lying on the downstream side of heat exchanger 50 in discharge line 62. By regulating the flow of water through the heat exchanger 50 in accordance with the temperature of the compressor discharge air exiting heat exchanger 50, the air temperature may be maintained approximately 225° F. under normal operating conditions. However, when the inlet temperature of the cooling medium is low, for example, when water under winter conditions is employed as the cooling medium, the regulating valve 58 reduces the water flow and will eventually close when the heat rejected from the compressor discharge air in the heat exchanger exceeds the heat rejection necessary to maintain the exit air temperature of the heat exchanger at 225° F. To cure the problem of an inability to reduce the water flow sufficiently at low water inlet temperatures to the heat exchanger when the system is operated in the purge mode, the present invention provides a pair of bypass passages 64 and 66. The first bypass passage 64 has a bypass orifice 68 and communicates with the cooling medium discharge line 62 and a cooling medium exhaust line 70 on opposite sides of valve 58. Passage 66 contains a bypass orifice 72 and a bypass isolation valve 74 and communicates with the cooling medium discharge line 62 and the cooling medium exhaust line 70 also on opposite sides of valve 58.

Downstream of the heat exchanger 50, there is provided a filter 76 and, optionally, a moisture separator as in the conventional system of FIG. 1. The minimized amount of condensation generated during low water temperature extremes could be blown from the system through the continuous blowdown 77. Downstream of the filter 76, the air line 78 splits for flow via passage 81 to an atomizing air compressor 80 and to a passage 82 containing an atomizing air/purge mode bypass valve 84. Downstream of valve 84, passage 82 splits to supply air via line 86 to the atomizing air manifold, not shown, via line 88 and to supply air via a passage 90 and a purge air manifold valve 92 to purge air manifolds, also not shown. A check valve 94 is provided between the juncture of lines 86 and 88 and compressor 80 to prevent backflow to the compressor.

Figure 3:
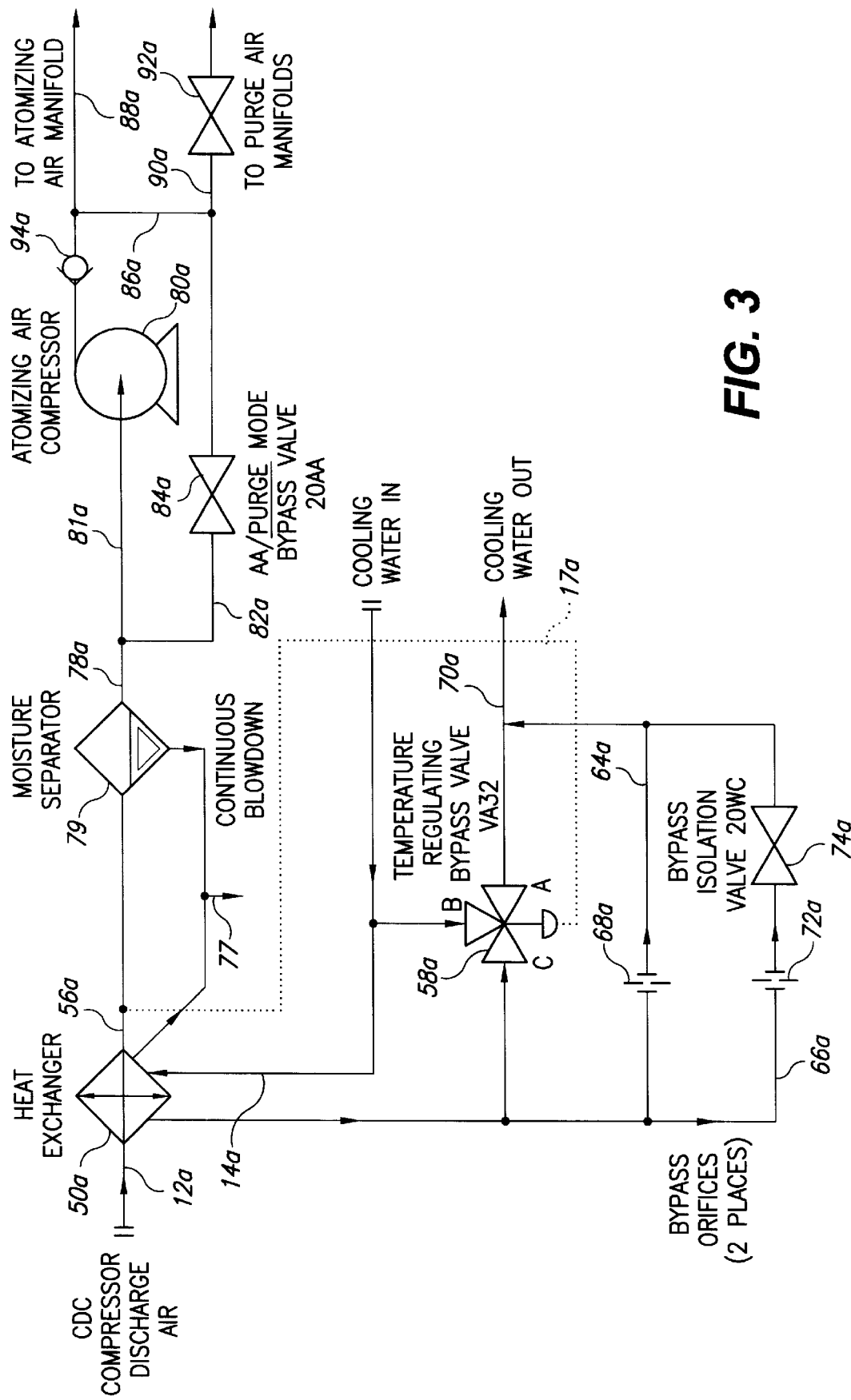
FIG. 3 is a view similar to FIG. 2 employing a counter-flow heat exchanger and a non-boosted purge.

Referring now to FIG. 3, there is illustrated a system similar to FIG. 2, one difference being the use of a counterflow heat exchanger instead of a parallel flow heat exchanger as in FIG. 2; another difference being the optional use of a moisture separator as in FIG. 1 instead of the filter in FIG. 2. Moisture separator particulate removal capability is comparable to that of the filter in the system operating flow range. In FIG. 3, like reference numerals are applied to like parts as in FIG. 2, followed by the suffix "a." Thus, as illustrated in FIG. 3, a counterflow heat exchanger 50a is provided with a compressor discharge air inlet 12a and a cooling medium, e.g., water, inlet 14a. Cooling medium flow through the heat exchanger 50a is controlled by a temperature-regulating valve 16a responsive to the temperature of the compressor discharge air exiting heat exchanger 10a as indicated by the dotted line 17a. As in the prior embodiment, first and second bypass passages 64a and 66a are provided in parallel on opposite sides of temperature control valve 16a. Passages 64a and 66a contain orifices 68a and 72a, respectively, passage 66a also containing a bypass isolation valve 74a. Bypass passages 64a and 66a are connected to the cooling medium exhaust line 70a. A moisture separator 79 is provided in line 56a. The air line 78a splits into passages 81 a and 82a containing the compressor 80a and atomizing air/purge mode bypass valve 84a. Passage 82a splits to supply air via line 86a to the atomizing air manifold, not shown, via line 88a and to supply air via a passage 90a and a purge air manifold valve 92a to purge air manifolds, also not shown. A check valve 94a is provided between the juncture of lines 86a and 88a and compressor 80a.

During atomizing air mode operation and operation of the turbine using liquid fuel, the atomizing air bypass valve 84 (84a) and purge air manifold valve 92 (92a) are closed to provide full air flow and full heat rejection in heat exchanger 50 (50a). Valve 74 (74a) is also opened to allow full or combined flow of bypass water through bath bypass passages 64a and 66a in the event the ambient temperature of the cooling medium is very low, causing over-cooling of the compressor discharge air and closure of the temperature regulating valve 58 (58a). The pair of bypass passages 64 (64a) and 66 (66a) are thus sized to maintain, during the air atomizing operation mode, minimum water flow through the heat exchanger should valve 58 (58a) close to prevent damage to the heat exchanger. During this liquid fuel operation, atomizing air at high pressure is supplied to the liquid fuel nozzle to atomize the liquid fuel.

In the purge mode, the bypass valve 84 (84a) and the purge air manifold valve 92 (92a) are opened. When valve 84 (84a) is open, valve 74 (74a) closes, limiting the bypass cooling medium flow to passage 64 (64a) when temperature regulating valve 58 (58a) closes. The orifice 68 (68a) in passage 64 (64a) is sized for operation in a purge mode. Consequently, further reduced water flow than the minimum water flow required for operation in the atomizing air mode is provided during purge air operation. During gas fuel operation of the turbine in the purge air mode, the purge air is supplied at reduced pressure to the purge air manifolds which, in turn, supply purge air to the water injection, atomizing air and liquid fuel nozzles.

It will be appreciated that flow through the bypass passages 64a and 66a is staged when the temperature regulating valve is closed dependent upon whether atomizing or purge air modes of operation are in use.

Figure 4:
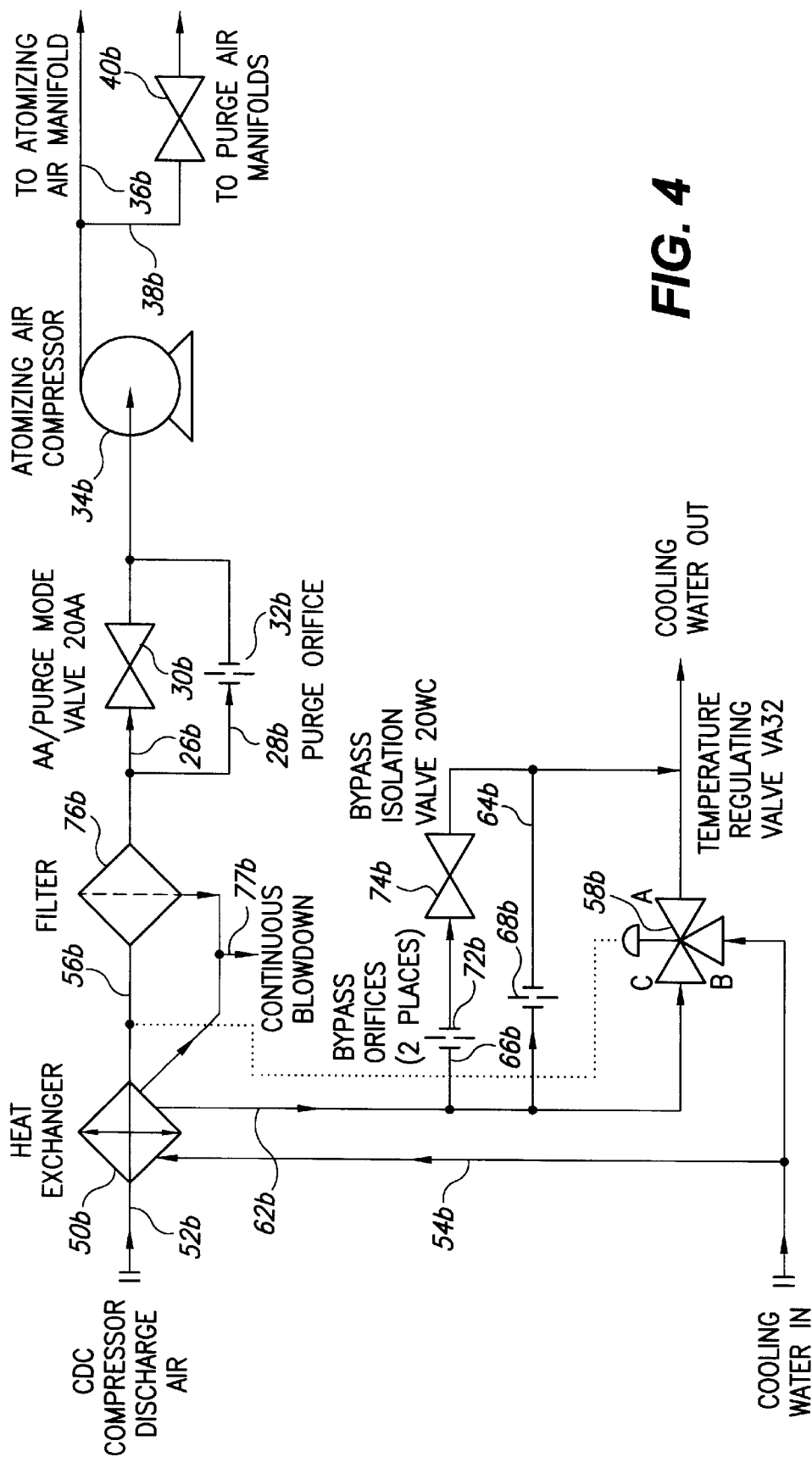
FIG. 4 is a view similar to FIG. 2 employing a parallel flow heater and a boosted purge.

Referring to FIG. 4, there is illustrated a system similar to FIG. 3, one difference being the use of boosted purge as in FIG. 1 rather than non-boosted purge as in FIGS. 2 and 3. In FIG. 4, like reference numerals are applied to like parts as in preceding embodiments followed by the suffix "b." Thus, during atomizing air mode operation with the turbine using liquid fuel, the air exiting filter 76b flows through the open atomizing air/purge mode valve 30b in parallel with orifice 32b to the atomizing air compressor 34b and to the atomizing air manifold via line 36b, the purge air manifold valve 40b being closed. In the boosted purge mode, the atomizing air/purge mode valve 30b is closed and reduced air flow flows through the passage 28b and orifice 32b to the atomizing air compressor 34b for flow to the atomizing air nozzle of the combustors via passage 36b and to purge air manifolds via purge air manifold valve 40b and line 38b.

In this manner, the different performance requirements for the atomizing air and purge modes of operation which employ different heat rejections in the heat exchanger are accommodated using the single heat exchanger.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. Apparatus for controlling the temperature of compressor discharge air supplied in a purge mode during gas fuel operation and in an atomizing air mode during liquid fuel operation in a dual-fuel gas turbine, comprising:

a heat exchanger for placing the compressor discharge air in heat exchange relation with a cooling medium at an inlet temperature to the heat exchanger lower than a temperature of the compressor discharge air for extracting heat from the compressor discharge air;

a valve for controlling the flow of the cooling medium through the heat exchanger;

first and second bypass flow passages connected in parallel on opposite sides of said flow control valve, each bypass flow passage having an orifice enabling a predetermined flow therethrough;

a bypass valve in said second flow passage;

said bypass valve being open in said atomizing air mode, enabling flow of the cooling medium through said first and second bypass flow passages and orifices and being closed in said purge mode, preventing flow through said second bypass passage.

2. Apparatus according to claim 1 wherein said heat exchanger is a parallel flow heat exchanger.

3. Apparatus according to claim 1 wherein said heat exchanger is a counterflow heat exchanger.

4. Apparatus according to claim 1 wherein said control valve is responsive to the temperature of the compressor discharge air exiting the heat exchanger.

5. Apparatus according to claim 1 including an air compressor and an atomizing air/purge mode bypass valve connected in parallel with discharge air exiting said heat exchanger, said atomizing air/purge mode bypass valve being opened to supply purge air to gas turbine combustors during the gas fuel operation.

6. Apparatus according to claim 1 including an atomizing air/purge mode valve and a purge orifice connected in parallel, with the discharge air exiting said heat exchanger, said parallel connected atomizing air/purge mode valve and said purge orifice being connected in series on a downstream side thereof, with an air compressor, said atomizing air/purge mode valve being closed to provide boosted reduced purge air flow via said purge orifice during gas fuel operation.

7. A method of controlling the temperature of compressor discharge air in a dual-fuel gas turbine having gas and liquid fuel operating modes, comprising the steps of:

passing the compressor discharge air to a heat exchanger in heat exchange relation with a cooling medium having an inlet temperature to the heat exchanger lower than the temperature of the compressor discharge air;

controlling the flow of the cooling medium through the heat exchanger to regulate the temperature of the compressor discharge air exiting the heat exchanger;

maintaining a minimum flow of cooling medium through said heat exchanger when operating the gas turbine in the liquid fuel mode; and reducing the flow of cooling medium through said heat exchanger to a flow below said minimum flow when operating the gas turbine in the gas fuel mode.

8. A method according to claim 6 wherein the step of controlling includes adjusting a flow regulating valve in response to the temperature of the compressor discharge air exiting said heat exchanger to control the flow of cooling medium through the heat exchanger, the step of maintaining includes flowing cooling medium through said heat exchanger via a bypass passage bypassing the valve to maintain said minimum flow through the heat exchanger when the valve is closed and the step of reducing includes partially closing the bypass flow passage.

9. A method according to claim 7 including providing a pair of bypass passages with one of said bypass passages having a bypass isolation valve, the step of maintaining including maintaining said bypass isolation valve open for flow of cooling medium through both said bypass passages to maintain said minimum flow of cooling medium.

10. A method according to claim 9 including closing said bypass isolation valve to reduce the flow of cooling medium below said minimum flow when operating in the gas fuel mode.

11. A method according to claim 7 wherein the step of controlling includes adjusting a flow regulating valve in response to the temperature of the compressor discharge air exiting said heat exchanger to control the flow of cooling medium through the heat exchanger and providing a counterflow heat exchanger.

12. A method according to claim 7 wherein the step of controlling includes adjusting a flow regulating valve in response to the temperature of the compressor discharge air exiting said heat exchanger to control the flow of cooling medium through the heat exchanger and providing a parallel flow heat exchanger.

* * * * *